(12) United States Patent
Reichel et al.

(10) Patent No.: US 9,346,401 B2
(45) Date of Patent: May 24, 2016

(54) MOTOR VEHICLE AND METHOD FOR OPERATING A MOTOR VEHICLE

(71) Applicant: AUDI AG, Ingolstadt (DE)

(72) Inventors: Michael Reichel, Ingolstadt (DE); Mohamed Essayed Bouzouraa, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/414,045

(22) PCT Filed: Nov. 7, 2013

(86) PCT No.: PCT/EP2013/003342
§ 371 (c)(1),
(2) Date: Jan. 9, 2015

(87) PCT Pub. No.: WO2014/072052
PCT Pub. Date: May 15, 2014

(65) Prior Publication Data
US 2015/0210216 A1    Jul. 30, 2015

(30) Foreign Application Priority Data
Nov. 10, 2012    (DE) .......................... 10 2012 022 150

(51) Int. Cl.
*B60R 1/00*        (2006.01)
*B60R 11/04*    (2006.01)
(Continued)

(52) U.S. Cl.
CPC ............... *B60R 1/00* (2013.01); *B60W 30/085* (2013.01); *B60W 30/09* (2013.01); *B60W 30/095* (2013.01); *B60W 30/18018* (2013.01); *B60W 40/04* (2013.01); *G06K 9/00791* (2013.01); *B60R 2300/103* (2013.01); *B60R 2300/106* (2013.01); *B60R 2300/8053* (2013.01);
(Continued)

(58) Field of Classification Search
USPC ......... 701/36, 41, 1, 96; 340/425.5, 438, 449; 348/148
See application file for complete search history.

(56) References Cited

U.S. PATENT DOCUMENTS 6,037,860 A    3/2000 Zander et al.
2003/0122929 A1*    7/2003 Minaudo ................... B60R 1/00
                                                                    348/148
(Continued)

FOREIGN PATENT DOCUMENTS

DE    0 903 714    3/1999
DE    101 33 103    1/2003
(Continued)

OTHER PUBLICATIONS

International Search Report issued by the European Patent Office in International Application PCT/EP2013/003342 on Jan. 28, 2014.

*Primary Examiner* — Yonel Beaulieu
(74) *Attorney, Agent, or Firm* — Henry M. Feiereisen LLC

(57) ABSTRACT

Motor vehicle with at least one control device, a thermal imaging camera and an image processing device, wherein the image processing device is designed to recognize objects on a thermal image from the thermal imaging camera, wherein the image processing device is designed to ascertain at least one object property of at least one recognized object, particularly of a recognized vehicle, by evaluating the thermal distribution in the thermal image in a region that includes the recognized object, wherein the control device is designed to use the object property for operation of a vehicle system.

20 Claims, 2 Drawing Sheets

(51) Int. Cl.
  *B60W 30/085* (2012.01)
  *B60W 30/095* (2012.01)
  *B60W 40/04* (2006.01)
  *B60W 30/09* (2012.01)
  *B60W 30/18* (2012.01)
  *G06K 9/00* (2006.01)
  *B60W 30/08* (2012.01)

(52) U.S. Cl.
  CPC .. *B60R 2300/8093* (2013.01); *B60W 2030/082* (2013.01); *B60W 2420/40* (2013.01)

(56) References Cited

U.S. PATENT DOCUMENTS

| | | |
|---|---|---|
| 2004/0243358 A1 | 12/2004 | Schliep et al. |
| 2005/0017859 A1 | 1/2005 | Dickmann et al. |
| 2005/0231339 A1* | 10/2005 | Kudo ............ B60R 1/00 340/435 |
| 2009/0002141 A1* | 1/2009 | Rinaldi ........... B60R 1/00 340/425.5 |
| 2013/0155236 A1* | 6/2013 | Ramdeo ........... H04N 7/183 348/148 |

FOREIGN PATENT DOCUMENTS

| | | |
|---|---|---|
| DE | 101 44 689 | 3/2003 |
| DE | 103 23 707 | 12/2004 |
| DE | 103 29 567 | 2/2005 |
| DE | 102004028324 | 2/2005 |
| DE | 102004037426 | 3/2006 |
| DE | 102005048562 | 4/2007 |
| DE | 102006051805 | 5/2007 |
| DE | 602005000532 | 10/2007 |
| DE | 102006059033 | 6/2008 |

* cited by examiner

MOTOR VEHICLE AND METHOD FOR OPERATING A MOTOR VEHICLE

CROSS-REFERENCES TO RELATED APPLICATIONS

This application is the U.S. National Stage of International Application No. PCT/EP2013/003342, filed Nov. 7, 2013, which designated the United States and has been published as International Publication No. WO 2014/072052and which claims the priority of German Patent Application, Serial No. 10 2012 022 150.9, filed Nov. 10, 2012, pursuant to 35 U.S.C. 119(a)-(d).

BACKGROUND OF THE INVENTION

The invention relates to a motor vehicle, with at least one control device, a thermal imaging camera and an image processing device, wherein the image processing device is designed for recognizing objects on a thermal image of the thermal imaging camera.

Driving assistance systems that provide safety and comfort functions are becoming increasingly important in modern motor vehicles. To make data that adequately reflect the environment available to the driving assistance systems, the sensors in motor vehicles is likewise becoming increasingly important. Above all, thermal imaging cameras are increasingly installed in high-end vehicles. Here, two systems are generally used. On the one hand, active thermal imaging cameras are used where the field of view of the camera is illuminated with infrared light. Such system provides image information similar to image information that can be recorded by a conventional camera, or image information as seen directly by the driver. This camera has the advantage that the environment can be similarly illuminated, such as illuminated with a high beam, without blinding drivers of oncoming vehicles.

Alternatively, passive infrared cameras are frequently used. In these cameras, only the infrared radiation emitted by objects is recorded. The strong point of these cameras is that animals or pedestrians on the road can be detected. Vehicles in series production already use systems that can detect pedestrians and give warning signals when a pedestrian moves toward the road or the vehicle.

SUMMARY OF THE INVENTION

It is therefore an object of the invention to provide a motor vehicle with improved evaluation of sensor information from an infrared camera.

To solve this problem, the image processing device in a motor vehicle of the aforementioned type is configured according to the invention to determine at least one object property of at least one detected object, especially of a detected vehicle, by evaluating the distribution of heat in the thermal image in an region encompassing the detected object, wherein the control device is configured to utilize the object property in the operation of a vehicle system.

The invention is based on the idea that after recognizing an object, further information can be obtained by evaluating the distribution of heat on the object and in the region around the object. Object recognition algorithms are often based on edge or contour detection. In this case, sharp contrasts are mainly used. A continuous variation, for example, a heat distribution is not used. Such an investigation of the heat distribution is particularly advantageous for objects that are composed of many different parts of widely differing heat. This is for example the case with motor vehicles.

The position or the presence of certain parts of an object can be recognized based on such a heat distribution. Since the object itself was already previously recognized, the type of the object can here already be used. For example, if a person is detected, then an attempt can be made to deliberately identify individual limbs. Conversely, if a vehicle is detected, then for example an attempt can be made to recognize an engine, exhaust gases or an exhaust system. This method can of course also be used in conjunction with other sensors. For example, the outline of a motor vehicle can be determined based on a video image, and the position of individual hot parts, such as the exhaust, can then be determined by the thermal imager. It is also possible to use a distance measuring sensor, in particular an ultrasonic sensor, for determining the distance of an object. Because a scale of the object is thus known, the subsequent image recognition is simplified.

A determination of additional object properties can offer great benefits. In the simplest case, it may be possible to confirm information that has been already obtained by another sensor system by evaluating the distribution of heat. Thus, the obtained information and hence the environment model present in the motor vehicle gain robustness. However, it will be described in more detail later, information may also be obtained, which allow better prediction of the behavior of other road users. In particular, the future behavior of stationary motor vehicles at the time of detection can be better predicted. For example, a likely direction of travel after start-up may be predicted by the determined tire position, or it can be determined whether the engine is running and therefore a start-up is expected.

In particular, a better and more robust environment model is useful in the context of accident prevention or minimization of the maximum severity of injuries. The accurate information on the movement of other vehicles obtained the inventive method can be used by suitable vehicle systems, in particular by forward and sideways vehicle guiding systems, for improved accident prevention. A better environment model also allows a more accurate crash prognosis, in particular in relation to other vehicles with whom a collision may be imminent, which then also allows a better control of the safety systems of a motor vehicle. For example, when an accident is no longer avoidable, additional information about the region of another motor vehicle with which a collision is expected to occur can be obtained. The deformability of a body section or of another identified component can then be substantially better estimated as an object property. This information can then be used for adaptive control of safety systems, in particular occupant restraint systems, for example, to adjust the triggering times of air bags. It is also possible to affect the trajectory of the vehicle in an impending unavoidable collision by influencing a plurality of vehicle systems, such as brakes, suspension, or steering so as to minimize the severity of the collision. In this case, it is also advantageous to determine and use deformability information. The determination of collision regions that involves special risks is also advantageous. In this case, a vehicle system can potentially act on the crash event in order to avoid a collision with this vehicle region.

It is possible that the object property or one of the object properties is an object orientation. In this case, for example, the direction of travel of the detected vehicle can be determined. This is particularly useful in situations where the detected vehicle is moving very slowly or is temporarily at a standstill. Methods based on the detection of movement can in this case provide information about the direction of the movement. However, the method can detect the front of the detected vehicle and thus predict the direction in which the vehicle is expected to move. In particular at intersections or traffic lights, other vehicles can thus be clearly assigned to the oncoming traffic or the side traffic. In addition, the determination of the orientation of a detected vehicle allows to check the plausibility of other sensor signals.

Preferably, the image processing for determining the object orientation of the detected motor vehicle may be embodied by determining the position of at least one exhaust pipe and/or of the engine of the detected motor vehicle relative to the position of the detected vehicle. Engine and exhaust pipe of a motor vehicle are particularly warm. In addition, hot exhaust gases are present in the region of the exhaust pipe. These objects radiate strongly in the infrared spectral region and can thus be well imaged. In contrast, large parts of the motor vehicle are much cooler. Thus, these assemblies can be clearly identified.

It is also possible that the object property or one of the object properties of the detected vehicle is the shape of the exhaust pipe and/or the quantity and/or form of the emitted exhaust gases, and that the image processing device is configured to evaluate the driving performance of the detected vehicle from these data. It can be advantageous for driving assistance systems, for example when starting up at a traffic light, to be able to assess the driving performance of other vehicles. High-performance motor vehicles have in every driving situation higher fuel consumption and hence also higher exhaust emissions than low-performance motor vehicles. Such a larger quantity of exhaust gas can be detected by an infrared camera. Additionally, information on the number and size of the exhaust pipes can be obtained. While these data alone may be seen at most as an indicator for the performance of a motor vehicle, they can confirm or refute information from other parts of the environment sensor.

Furthermore, with the motor vehicle according to the invention, an object property or one of the object properties may also be a shape and/or size of the object. A conventional camera may have trouble detecting an edge especially at night and in rain or snow. In the dark and under illumination with headlights, the detection of edges of objects can also be complicated due to cast shadows. While the resolution of images of a passive infrared camera is generally lower, they can be used especially in combination with other sensor data to achieve a more robust edge and size estimation. Above all, many objects are warmer than the environment at night and in the rain or snow and can be well imaged with an infrared camera. Even cast shadows, which are hard to distinguish in the image evaluation from real edges in an image of the vehicle environment in the visible region, are not problematic in the image of a passive infrared camera, because the passive infrared camera does not work with active illumination.

An object property or one of the object properties of the detected vehicle may also be a type of drive train, wherein in particular internal combustion drive trains can be identified from the presence of at least one exhaust pipe or exhaust gases, while electric drive trains can be identified from the presence of batteries.

Exhaust systems and also batteries for electric vehicles and hybrid vehicles are noticeably warmer during driving than the other vehicle environment. The greater heat of hybrid or electric vehicle batteries compared to the battery of a motor vehicle with an internal combustion engine is due to the larger power output of these batteries. Thus, these batteries are warmer and easier to recognize in the infrared image. Batteries in an electric vehicle or a hybrid vehicle also take up considerably more space. This can in many cases be used to distinguish between vehicles with an internal combustion engine or an electric motor, or hybrid vehicles. This can be useful for many driving assistance systems. Firstly, vehicles with electric motor have in many driving situations a very different driving behavior. For example, much higher accelerations can be achieved especially at low speeds. On the other hand, the information that the vehicle is an electric vehicle is also important for safety reasons. Lithium-ion batteries are widely used in electric and hybrid vehicles. If these are damaged, there is a risk that water enters, with a potential substantial risk that the accumulator heats up, causing fire and deflagration. A driver assistance system can therefore attempt, when a collision is imminent, to brake or steer the vehicle so as to prevent damage to the batteries. Lithium-ion batteries at the scene of an accident represent additional risks. Therefore, the control device may be designed, after a collision of the detected vehicle, to control a display device for displaying a message relating to the type of drive of the detected vehicle. A driver can thus be informed before he, for example, assists in an accident.

It is also advantageous if the object property or one of the object properties of the detected vehicle is an operating state, in particular the operation of an engine identified by the presence of exhaust gases and/or the temperature of the engine and/or of the batteries. The information about the operating state of other motor vehicles allows a better assessment of the traffic situation. For example, it can be recognized early on that a parked vehicle starts its engine. This is an early indication that the vehicle may leave a parking space. On the other hand, such an identification of the operating state may, for example, also be used when looking for a parking space in a parking garage. When the engine of a stationary vehicle in a parking space runs, there is a higher probability that this parking space will soon be free. Identification of the operating state may also be useful in traffic congestion, at traffic lights and at intersections. This is especially the case, when the motor vehicle is equipped with an automatic start, and the control device for controlling the automatic start system is formed in dependence on the operating state of an engine of the detected vehicle. For example, the engine may be turned off at a traffic light, and the engine start can be made dependent on the operating state of the engine of the vehicle in front.

In order to better predict the movement of other road users, the object property or one of the object properties of the detected vehicle may advantageously be the orientation and/or position of at least one wheel, which is heated due driving of the detected vehicle. An identification of the position of the wheels can give and/or confirm information about an orientation of the detected vehicle. However, the orientation of wheels may also be identified. This makes it possible to predict the future movement of the detected vehicle. This is very difficult with other methods especially for stationary vehicles or for very slow moving vehicles.

In addition, the object property or one of the object properties of the detected vehicle may be the position of a base of the at least one wheel. The base of the wheel can be relatively easily identified, since wheel and the road usually have significantly different temperatures. The distance to the detected vehicle can be calculated from the position of the base and of the wheel. In the simplest case, it is here assumed that the detected vehicle is located at the same level as the motor vehicle of the invention. However, if a solid angle imaged by this pixel is associated with each pixel of the infrared camera, and if the origin is chosen at the center pixel, then pixels located farther away from and below the center correspond to larger solid angles between the camera and the base of the vehicle, which again indicates that the vehicle is closer. If the detected motor vehicle is located at a different height than the motor vehicle according to the invention, then a distance can not be directly calculated; however, if a distance is known, a height information can be calculated, or if a height information is known, a distance can be calculated. For example, a distance can be calculated if height information is available from a high-resolution map in conjunction with GPS information in particular in an imminent collision, the object property or one of the object properties of the detected vehicle may be the position of an engine and/or of at least one battery. Upon detection of an imminent collision with another vehicle, the control device may be designed for controlling a driving intervention and/or at least one safety system by taking into account at least one determined object property. The safety systems of motor vehicles are often complex and control a large number of individual systems, such as triggering or the triggering time of airbags or seatbelt tensioners, adjustments to the steering, selective braking or adjustments to the chassis. The aim of all these systems is of course firstly accident prevention. Therefore, a multi-stage process takes place in most driving assistance systems, wherein initially warning systems are activated, in a further stage braking or steering is assisted, and in the last stage an attempt is made to have the collision occur in such a way that personal injury is minimized. The functionality and performance of these systems depends critically on the quality of the environment model present in the vehicle. Therefore, it is obvious to gather a large number of possible information from a plurality of sensors in order to make these functions more robust against errors as well as more efficient. A plurality of object information, especially about the other vehicle(s) involved in the collision may be provided for the motor vehicle according to the invention, particularly in the context of a combination of data from other sensors. In particular, the at least one determined object property for controlling the driving intervention and/or the safety system may be an element selected from the group object orientation, shape, size, driving performance, distance, position of the engine, position of at least one battery and position of easily deformable parts of the object.

The object property or one of the object properties of the detected vehicle may also be the position of regions which causes in a collision the smallest maximum severity of injury of vehicle occupants, and the control unit may be designed, in the event of a computationally inevitable collision, to control the motor vehicle so as to collide with these regions, wherein the determination of these regions includes at least a recognition of regions that result in a collision in a high maximum injury severity, such as the battery or the engine, by detecting thermal signatures and/or by detecting easily deformable regions and taking into account the material temperature.

Injuries in accidents are usually caused by sudden accelerations, crushing or fire. To avoid sudden accelerations or crushing, it is important that an attempt is made during a collision to expose the vehicle and the body continuously to low accelerations. A collision with very heavy and rigid components should therefore be avoided. A heavy and rigid component is the engine. Also, an accident is much more serious when the vehicle catches fire. As mentioned above, especially damage to lithium-ion batteries represents a severe risk for fire or deflagration. Therefore, a collision with an region of a vehicle portion with batteries should be avoided, if possible.

In particular, in the event of a not too serious accident, it may be advantageous to collide with particularly easily deformable components of the body of another vehicle. In addition to the material with which the collision takes place, the temperature of the material may have an influence on its rigidity. In particular with plastic materials, but also in metals, it may therefore be advantageous to identify particularly warm regions, since these are easily deformable.

In addition, the invention also relates to a method for operating a motor vehicle having a thermal imaging camera, an image processing device and a control device, with the steps of:

recording a thermal image with the thermal imager,
detecting an object, in particular a vehicle, on the thermal image with the image processing device,
determining with the image processing device at least one object property by evaluating the heat distribution in the thermal image in an region encompassing the object,
using with the control device the object property in the operation of at least one vehicle system.

The embodiments of the object property and of the operated vehicles systems disclosed with respect to the motor vehicle can also be used for the development of the method.

BRIEF DESCRIPTION OF THE DRAWING

Further advantages and details of the invention will become apparent from the exemplary embodiments described below and from the drawings. The drawings show in.

DETAILED DESCRIPTION OF PREFERRED EMBODIMENTS

Figure 1:
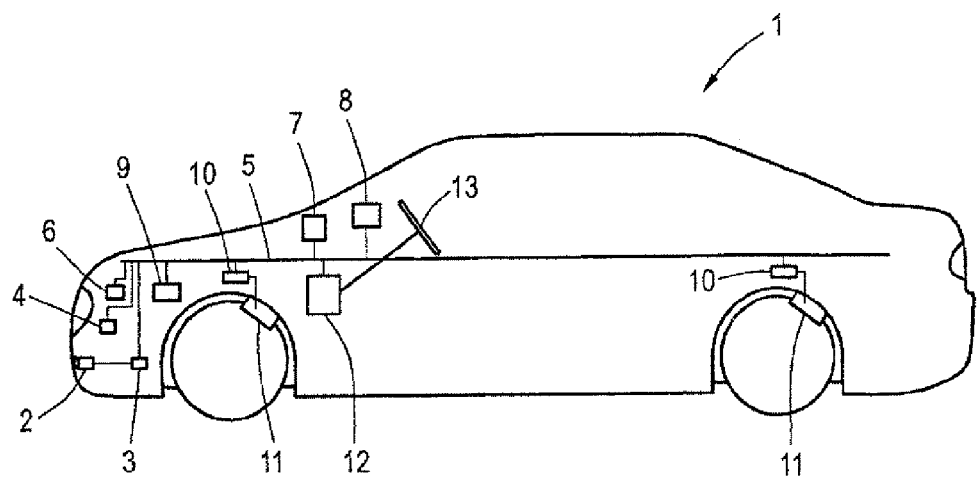
FIG. 1 is a schematic diagram of a motor vehicle according to the present invention, FIG. 2 an exemplary embodiment for detecting object properties based on a rear view of a motor vehicle with an internal combustion engine, FIG. 3 an exemplary embodiment for detecting object properties based on a front view of a motor vehicle, and FIG. 4 an exemplary embodiment for detecting object properties based on a side view of an electric vehicle.

FIG. 1 shows a schematic diagram of a motor vehicle. The motor vehicle 1 includes an infrared camera 2 and an image processing device 3 that processes the data from the infrared camera 2. The image processing device 3 serves here two purposes. Firstly, in a first step, objects are detected, while properties of objects detected in a second step by evaluating the heat distribution in the thermal image in a region encompassing the detected object. The motor vehicle 1 is also equipped with other sensors 4 and data processing devices associated with the sensors. A data exchange between the other sensors 4 and the associated data processing devices and image processing device 3 can take place via a CAN bus 5. In this way, information of the image recognition of a camera operating in the visible range can be provided to the image processing device 3. The other way around, images from the infrared camera 2 and the information obtained therefrom with the image processing device 3 may be used for evaluating the data from the other sensors 4. Different types of combinations of sensor data and information can be envisaged.

The object recognition itself is based on an edge detection. Hence especially sharp transitions in the image are used in this step to gain information. When an object is detected, the internal structures of the object and additional information about the object can be identified by using the information about the identified object type. Additionally, information from an additional sensor 4, for example from a camera operating in the optical range, may be used to compare the heat distribution on the object with the shape of the object detected with the optical camera. The identified object properties are transmitted from the image processing device 3 via the CAN bus 5 to a control device 6 which is able to perform a variety of control tasks. The image from the infrared camera 2 can also be transmitted via the CAN bus 5 to a display device 7 in the vehicle's passenger compartment. If the display system 7 displays an image from the infrared camera 2, then this image can be supplemented by the control device 6 with further information obtained by the image processing device 3. It is thus possible to display the operating state of detected vehicles, their orientation, the distance to detected objects and the type of drive of a detected vehicle. The information displayed on the display system 7 can be selected via control elements 8 which are constructed as a display screen with soft keys and a push/turn control knob. Multiple vehicle systems are controlled directly besides the pure display of additional information. The motor vehicle 1 is equipped with an automatic start-stop system. When after activation of the automatic start-stop system, for example at a traffic signal, a change of the operating state of another motor vehicle standing in front of the motor vehicle from the operational state of a turned-off engine to an operating state of a turned-on engine is detected, a control signal for starting the engine is sent automatically from the image processing device 3 via the CAN bus 5 to the ignition 9. Thus, a brisk start in spite of the automatic start-stop system is ensured.

The control device 6 also provides a variety of driver assistance systems, such as forward and sideways vehicle guiding systems. These driving assistance systems can also use the object properties of detected objects determined by the image processing device 3. By detecting these additional object properties, oncoming traffic and side traffic can be better detection through detection of the vehicle orientation. Also, active road users can be more easily distinguished from parked vehicles, especially when in stalled traffic in congested regions, at traffic signals or intersections.

The object properties determined by the image processing device 3 are also used for a variety of safety systems. To prevent accidents or to reduce the consequences of accidents, a collision protection system, which includes a brake assist system 10 for controlling the brakes and a steering assistance system 12 for adjusting the steering, is controlled upon detection of a collision risk by the data from the other sensors 4 and the infrared camera 2, respectively, by the control device 6 via the CAN bus 5 so as to prevent an impending accident and/or minimize the consequences for the occupants of the motor vehicles. The image processing device 3 of the infrared camera 2 hereby provides a variety of additional object information. For example, on the one hand, the traffic situation can be better judged by the driver assistance systems of the control device 6 based on additional information about object orientation, shape, size, driving performance and distance of detected objects. On the other hand, regions of detected motor vehicles can be determined wherein in a collision with these regions a particularly large or a very small maximum injury severity can be expected, or when the expected injury severity is small, a particularly light or heavy damage to the motor vehicle can be expected. A particularly large maximum severity of injury and serious damage to the motor vehicle is mainly expected in a collision with rigid and sluggish components such as the engine, as well as with components resulting in a fire hazard, such as batteries. The expected injury severity and the collision damage can be reduced, especially at not exceedingly high collision speeds, when the collision occurs only with easily deformable parts of the other vehicle. Here, the temperature of vehicle parts can also be taken into account, since especially the deformability increases markedly with increasing temperature, in particular for plastic parts. After detection of such regions by the image processing device 3, these regions can be transmitted to the control device 6 via the CAN bus 5, which controls with this information the brake assist system 10 for controlling the brakes 11 and the steering assist system 12 for adjusting the steering 13 so that in the event of an unavoidable collision, the collision takes place with the previously determined regions having a small maximum injury severity.

The motor vehicle 1 also has a variety of safety systems (not shown), such as occupant restraint systems. Via the CAN bus 5, the control device 6 can influence the behavior of the safety systems in the event of accidents depending on a crash prognosis. This makes an adaptive control of the safety systems possible. Again, information obtained from the data of the infrared camera 2 by using the image processing device 3 can be used. When controlling the safety systems, for example, a detected information about the deformation behavior of an region of another vehicle at risk of a collision may be considered.

Figure 2:
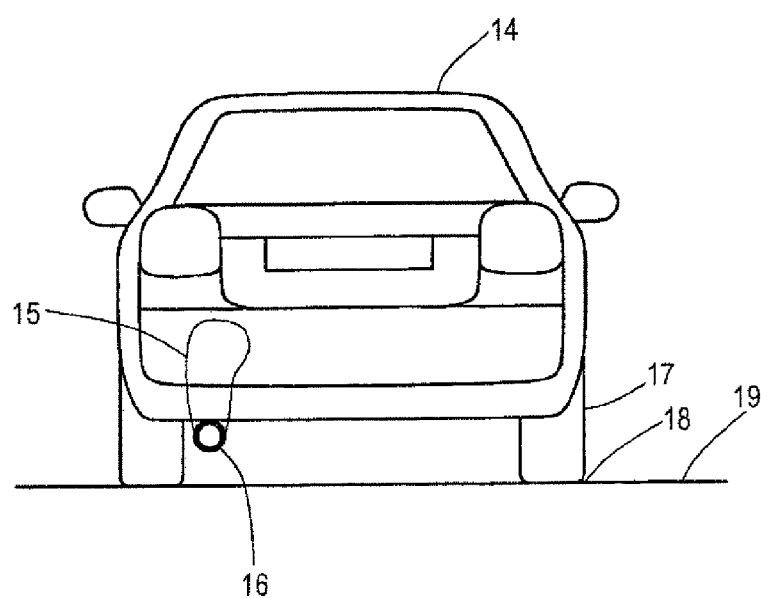

FIG. 2 shows an exemplary embodiment for detecting object properties of a preceding motor vehicle 14 with an internal combustion engine. The vehicle itself is detected by either the infrared camera 2 or by using additional sensors 4, such as a video camera. In particular regions of the detected vehicle 14 whose temperature is above ambient temperature can be particularly well identified with the infrared camera 2. These are for a preceding vehicle 14 with an internal combustion engine the exhaust gases 15, the exhaust pipe 16 and the rear wheels 17. The contour of the detected vehicle 14 can be better detected by device of the infrared camera 2 especially in rain, snow or darkness. It can be readily seen from contour of the detected vehicle 14 and the position of the wheels 16, of the exhaust system 17 and the exhaust gases 15 that the detected vehicle is seen from behind, thus driving ahead of the own car. It is especially important to identify the orientation especially in situations where the motor vehicle 14 is at rest, i.e., for example at intersections. It can also easily be seen from the presence of exhaust gas 15 that the engine of the vehicle 14 is running. It can then already be observed from a distance whether a motor vehicle 14 is temporarily at rest due to traffic conditions, or whether the vehicle 14 is parked.

The detected wheels 17 can also be used for determining a distance. The base 18 of the wheel 17 is easy to recognize because it is located at the transition point between the wheel 17 and road 19. The position of the base 18 of the wheel 17 can unambiguously be assigned in the picture of the infrared camera 2 to a group of pixels. Since each pixel of the infrared camera 2 corresponds to a solid angle, the position of the base 18 can be assigned to a certain solid angle. When the height of the base 18 is known, the distance between the base 18 and the own vehicle 1 can be determined. If it is determined that the vehicle 14 is at the same height as the own vehicle 1, the height of the onboard infrared camera 2 is known with respect to the base 18 and the distance can be calculated. If there a difference in height between the detected vehicle and the own vehicle, then a distance calculation is not readily possible. However, when height information is known, for example from maps, the distance can in turn be calculated. If the distance to the detected vehicle 14 is otherwise known, then height information can be determined from the position of the base 18. Additional information about the course of the roadway is thus obtained, which are used to control other vehicle systems.

Figure 3:
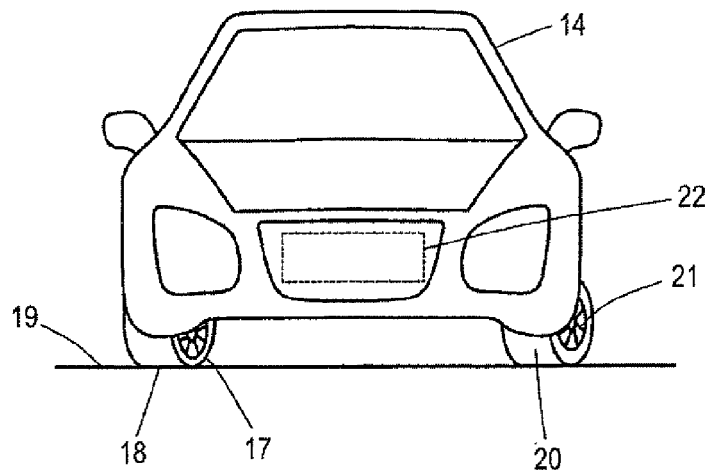

FIG. 3 shows schematically a front view of a detected motor vehicle 14. Here, too, especially hot components of the motor vehicle 14 can be detected in the image of the infrared camera 2. These are in addition to the contour of the motor vehicle 14, especially the engine block 22 and the wheels 17, especially the shell 20. A steering angle can also be detected for the wheels 17 because the rim 21 is in general noticeably cooler than the shell 20. When turned wheels 17 are detected, this is an indication that these are the front wheels. It can be determined with a high probability from the contour of the detected vehicle 14, the identification of the turned front wheels 17, and the detected engine block 22 that this is an oncoming vehicle 14. A warm shell 20 of the wheel 17 and a warm engine block 22 also indicate a high probability that the vehicle is not a parked vehicle. It can thus be recognized, especially in situations where the detected vehicle 14 is at rest, that this is an active road user, that the detected vehicle 14 is expected to move to the right when starting up, and that it is an oncoming vehicle. A distance can again be determined from the position of the base point 18, i.e. the transition between the wheel 17 and the road 19, as in the previous example. In an impending collision, both the steering angle can be used to predict the movement of the detected vehicle 14, as well as the position of the engine block 22 for experiencing a collision with the smallest maximum injury severity and/or the least damage. In addition, the trigger timing of safety systems, especially of occupant restraint systems such as airbags or seat-belt tensioners, can also be adjusted, for example, depending on the position of the engine block 22.

Figure 4:
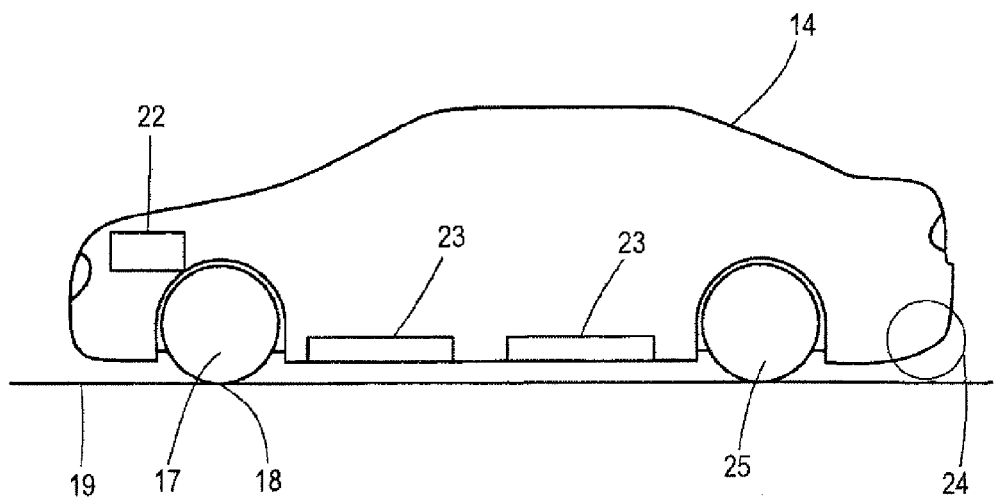

FIG. 4 is a schematic side view of a detected motor vehicle 14 with an electric motor. It can be determined from the detected tires 17 as well as from the contour of the detected motor vehicle 14 that the detected motor vehicle 14 is viewed from the side. An exhaust manifold and exhaust gases should be visible in region 24 in a side view of a vehicle with a combustion engine 14. Since the detected motor vehicle 14 does not show discernible warm objects in this region, the vehicle is either a parked vehicle or an electric vehicle. However, an elevated temperature of the engine block 22 and the batteries 23 indicates that the vehicle is not a parked vehicle. The detected batteries 23 also suggest with high probability that the vehicle is an electric vehicle or a hybrid vehicle. Again, the distance can be determined by determining the base point 18 between the wheel 17 and road 19. For predicting the direction of movement, especially when the vehicle 14 is at rest, the imaged shape of the wheel 17, which is generally steered, can be compared with the shape of the rear wheel 25. Both wheels 17 and 25 have here the same shape, indicating a straight course of the motor vehicle 14. If in this case a collision with the detected vehicle 14 is inevitable, an attempt can be made with the control device 6 by using the additional information obtained by the image processing device 3 of the infrared camera 2 to prevent damage to the batteries 23 and thus to avoid additional hazards. This is especially important because the position of batteries 23 in electric and hybrid vehicles may be different. The position of the battery can hence not be determined from the vehicle contour. The battery position must therefore be determined directly.

What is claimed is:

1. A motor vehicle, comprising
a thermal imaging camera, and
an image processing device configured to recognize objects on a thermal image of the thermal imaging camera, and to detect at least one object property of at least one recognized object by evaluating a distribution of heat in the thermal image in a region located within the thermal image of the at least one recognized object, and
at least one control device configured to use the at least one object property during operation of a vehicle system.

2. The motor vehicle of claim 1, wherein at least one recognized object is a detected vehicle.

3. The motor vehicle of claim 1, wherein the object property or one of the least one object property is an object orientation.

4. The motor vehicle of claim 3, wherein the at least one recognized object is a detected vehicle and the image processing device is configured to determine the object orientation of the detected vehicle by determining a position of at least one of an exhaust pipe and a motor of the detected vehicle in relation to a position of the detected vehicle.

5. The motor vehicle of claim 1, wherein the at least one object property of the detected vehicle is selected from data comprising a shape of an exhaust pipe and an amount or shape of emitted exhaust gases, and wherein the image processing device is configured to evaluate a driving performance of the detected vehicle from these data.

6. The motor vehicle of claim 1, wherein the at least one object property is a shape or a size of the object.

7. The motor vehicle of claim 1, wherein the at least one object property of the detected vehicle is a type of a drive train, wherein a drive train having a combustion engine is identified by presence of at least one exhaust pipe or of exhaust gases, and a drive train having an electric motor is detected by presence of batteries.

8. The motor vehicle of claim 7, wherein the control device is configured, following a collision of the detected motor vehicle, to control a display device for displaying an indication of the type of the drive train of the detected vehicle.

9. The motor vehicle of claim 1, wherein the at least one object property of the detected vehicle is an operating state of a motor, which can be detected by at least one of a presence of exhaust gases, a temperature of the motor and a temperature of batteries.

10. The motor vehicle of claim 9, wherein the control device is configured to control an automatic start function in dependence of an operating state of a motor of the detected vehicle.

11. The motor vehicle of claim 1, wherein the at least one object property of the detected vehicle is an orientation or a position of at least one wheel, which is heated when the detected vehicle is driven.

12. The motor vehicle of claim 11, wherein the at least one object property of the detected vehicle is a position of a base point of the at least one wheel.

13. The motor vehicle of claim 12, wherein the at least one object property is a distance of the detected vehicle, wherein the image processing device is configured to determine the distance from the position of the base point of the at least one wheel.

14. The motor vehicle of claim 1, wherein the at least one object property of the detected vehicle is a position of a motor or of at least one battery, or both.

15. The motor vehicle of claim 1, wherein the control device is configured, upon detection of an imminent collision with another vehicle, to control a driving intervention or at least one safety system, or both, by taking into account the at least one determined object property.

16. The motor vehicle of claim 15, wherein the at least one determined object property for controlling the driving intervention or the safety system comprises elements selected from the group consisting of object orientation, shape, size, driving performance, distance and position of a motor, position of at least one battery and position of easily deformable parts of the object.

17. The motor vehicle of claim 15, wherein the at least one determined object property of the detected vehicle is a position of regions that cause in a collision a smallest maximum injury severity of vehicle occupants, and wherein the control device is configured, in the event of an inevitable collision as computed by the control device, to control the motor vehicle for a collision with these regions, wherein identifying these regions includes at least a detection of regions that cause in a collision a high maximum injury severity by detecting thermal signatures and/or by detecting easily deformable regions by taking into account a material temperature.

18. The motor vehicle of claim 17, wherein the detected regions comprise regions that include batteries or the motor.

19. A method for operating a motor vehicle having a thermal imaging camera, an image processing device and a control device, with the steps of:
- recording a thermal image with the thermal imaging camera,
- identifying with the image processing device an object on the thermal image,
- determining with the image processing device at least one object property by evaluating a distribution of heat in the thermal image in a region located within the thermal image of the object, and
- using with the control device the object property when operating at least one vehicle system.

20. The method of claim 19, wherein the object is a vehicle.

* * * * *